(12) United States Patent
Hattiangadi et al.

(10) Patent No.: US 10,844,758 B2
(45) Date of Patent: Nov. 24, 2020

(54) ENGINE AND GAS EXCHANGE VALVE WITH UNDER-HEAD FILLET CONTOURED FOR CHORDAL STRESS MITIGATION

(71) Applicant: Caterpillar Inc., Deerfield, IL (US)

(72) Inventors: Ashwin Hattiangadi, Edwards, IL (US); Rong Qu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 10 days.

(21) Appl. No.: 16/253,749

(22) Filed: Jan. 22, 2019

(65) Prior Publication Data

US 2020/0232353 A1    Jul. 23, 2020

(51) Int. Cl.
*F01L 3/00* (2006.01)
*F01L 3/04* (2006.01)
*F16K 1/44* (2006.01)

(52) U.S. Cl.
CPC ............. *F01L 3/04* (2013.01); *F16K 1/443* (2013.01)

(58) Field of Classification Search
CPC ...... F01L 3/00; F01L 3/20; F01L 3/06; B21K 1/22
USPC ...................................................... 123/188.8
See application file for complete search history.

(56) References Cited

U.S. PATENT DOCUMENTS

| 4,686,348 A | * | 8/1987 | Johns | ...................... | F01L 3/02 |
| | | | | | 123/41.77 |
| 4,881,500 A | * | 11/1989 | Kojima | ...................... | F01L 3/20 |
| | | | | | 123/188.3 |
| 5,081,965 A | | 1/1992 | Walters et al. | | |
| 5,592,913 A | | 1/1997 | Matthews | | |
| 5,787,853 A | * | 8/1998 | Adachi | ...................... | B23C 3/055 |
| | | | | | 123/188.8 |
| 6,125,809 A | * | 10/2000 | Boast | ...................... | F01L 3/20 |
| | | | | | 123/188.3 |
| 9,163,734 B2 | * | 10/2015 | Mikami | ...................... | B21K 1/22 |
| 2013/0312694 A1 | * | 11/2013 | Sakaguchi | ............... | F01L 3/00 |
| | | | | | 123/188.3 |
| 2015/0354494 A1 | * | 12/2015 | Furukawa | ................. | F01L 1/26 |
| | | | | | 123/193.5 |
| 2017/0152768 A1 | | 6/2017 | Qu | | |
| 2017/0211434 A1 | * | 7/2017 | Mikami | ............... | B23P 15/002 |

FOREIGN PATENT DOCUMENTS

| CN | 200999635 | 1/2008 |
| CN | 201581948 | 9/2010 |
| CN | 203296848 | 11/2013 |

(Continued)

*Primary Examiner* — Long T Tran
*Assistant Examiner* — James J Kim
(74) *Attorney, Agent, or Firm* — Brannon Sowers & Cracraft

(57) ABSTRACT

A gas exchange valve in an internal combustion engine includes a valve head having a sealing face structured to contact a valve seat and defining a face angle. The valve head further includes an under-head fillet transitioning from the inner sealing face to a valve stem, and defining a chordal stress zone within the under-head fillet. The under-head fillet is formed by a material distributed according to a stress-diffusing contour within the chordal stress zone, and is blended with the inner sealing face at a blend angle that is less than the face angle and is in a range of about 18° to about 35°. The valve head contour is associated with resistance to chordal stress-induced fatigue failure.

20 Claims, 3 Drawing Sheets

(56) References Cited

FOREIGN PATENT DOCUMENTS

| | | |
|---|---|---|
| DE | 3639147 | 5/1988 |
| DE | 19754138 | 6/1999 |
| DE | 102013216188 | 3/2015 |
| EP | 3033500 B1 | 3/2017 |

* cited by examiner

ENGINE AND GAS EXCHANGE VALVE WITH UNDER-HEAD FILLET CONTOURED FOR CHORDAL STRESS MITIGATION

TECHNICAL FIELD

The present disclosure relates generally to engine valves and associated hardware, and more particularly to a gas exchange valve structured for resistance to fatigue.

BACKGROUND

Gas exchange valves are used in internal combustion engines to control fluid communications between a cylinder, and a supply of intake air or intake air and other gases such as recirculated exhaust gas, or between the cylinder and an exhaust manifold for expelling combustion products. Some known designs include a single intake valve and a single exhaust valve associated with each engine cylinder. Other designs employ multiple gas exchange valves of each type in association with each cylinder. A camshaft, typically rotated at half engine speed, is coupled with valve lifters, bridges, rocker arms, or other apparatus for controlling opening and closing of gas exchange valves appropriately. In some engine designs gas exchange valves are equipped with actuators for enabling so-called variable valve timings which can be at least somewhat independent of a cam-dictated timing, for various purposes.

Such gas exchange valves are moved into and out of contact with an engine head or valve seat insert within an engine head to effect opening and closing. Significant mechanical forces from valve actuating mechanisms, as well as cylinder pressures, can act to move gas exchange valves open or closed. In-cylinder temperatures may be at least several hundred degrees, and in the case of certain exhaust valve applications can heat exhaust valves to at least several hundred degrees C. For these reasons gas exchange valve operating conditions can be quite harsh. It has been observed that certain gas exchange valves can experience fatigue failure over the course of an engine's service life, in response to thousands, millions or even billions of cycles of opening and closing. When an engine is torn down for remanufacture or salvaging, evidence of progression toward fatigue failure can sometimes be directly observed. Engineers have experimented with many different techniques which attempt to ameliorate or forestall gas exchange valve fatigue phenomena. Even minute changes in gas exchange valve design, engine operating conditions, tolerance stack-ups, or other phenomena can significantly impact gas exchange valve service life. One known gas exchange valve design is set forth in U.S. Pat. No. 6,125,809 to Boast, and proposes a valve design having a necked down portion to reduce stresses on the head and extend its life. Although the Boast design may perform as intended, there is always room for improvements or alternative design strategies.

SUMMARY OF THE INVENTION

In one aspect, an internal combustion engine includes an engine housing including a cylinder block with a cylinder formed therein, an engine head coupled to the cylinder block and having a gas exchange conduit formed therein, and a valve seat forming an opening to the gas exchange conduit. The internal combustion engine further includes a gas exchange valve movable between an open position and a closed position to control fluid communications between the cylinder and the gas exchange conduit. The gas exchange valve includes a valve stem defining a longitudinal axis, and a valve head attached to the valve stem and having an outer combustion face defining a plane oriented normal to the longitudinal axis. The valve head further includes an inner sealing face structured to contact the valve seat at the closed position. The inner sealing face defines a face angle relative to the plane, and the valve seat defines a seat angle relative to the plane that is greater than the face angle. The valve head further includes an under-head fillet transitioning from the inner sealing face to the valve stem, and defining a chordal stress zone within the under-head fillet. The under-head fillet is formed by a material distributed according to a stress-diffusing contour within the chordal stress zone, and the under-head fillet is blended with the inner sealing face at a blend angle relative to the plane that is less than the face angle and is in a range of about 18° to about 35°.

In another aspect, a gas exchange valve for controlling fluid communications between a combustion cylinder and a gas exchange conduit in an internal combustion engine includes a valve body having a valve stem defining a longitudinal axis, and a valve head attached to the valve stem and having an outer combustion face defining a plane oriented normal to the longitudinal axis. The valve head further includes an inner sealing face structured to contact the valve seat at the closed position, and an outer perimetric edge surface extending axially between the outer combustion face and the inner sealing face. The inner sealing face defines a face angle relative to the plane. The valve head further includes an under-head fillet transitioning from the inner sealing face to the valve stem, and defining a chordal stress zone within the under-head fillet. The under-head fillet is formed by a material distributed according to a stress-diffusing contour within the chordal stress zone, and the under-head fillet being blended with the inner sealing face at a blend angle relative to the plane that is less than the face angle and is in a range of about 18° to about 35°.

In still another aspect, a gas exchange valve includes a valve body having a valve stem defining a longitudinal axis, and a valve head attached to the valve stem and having an outer combustion face defining a plane oriented normal to the longitudinal axis. The valve head further includes an inner sealing face extending circumferentially around the longitudinal axis and oriented at a face angle relative to the plane that is less than 45°. The valve head further includes an under-head fillet transitioning from the inner sealing face to the valve stem, and defining a chordal stress zone within the under-head fillet. The under-head fillet is formed by a material distributed according to a stress-diffusing contour within the chordal stress zone, and material forming a blend between the chordal stress zone and the inner sealing face. The blend has a blend angle relative to the plane that is in a range of about 18° to about 35°.

DETAILED DESCRIPTION

Figure 1:
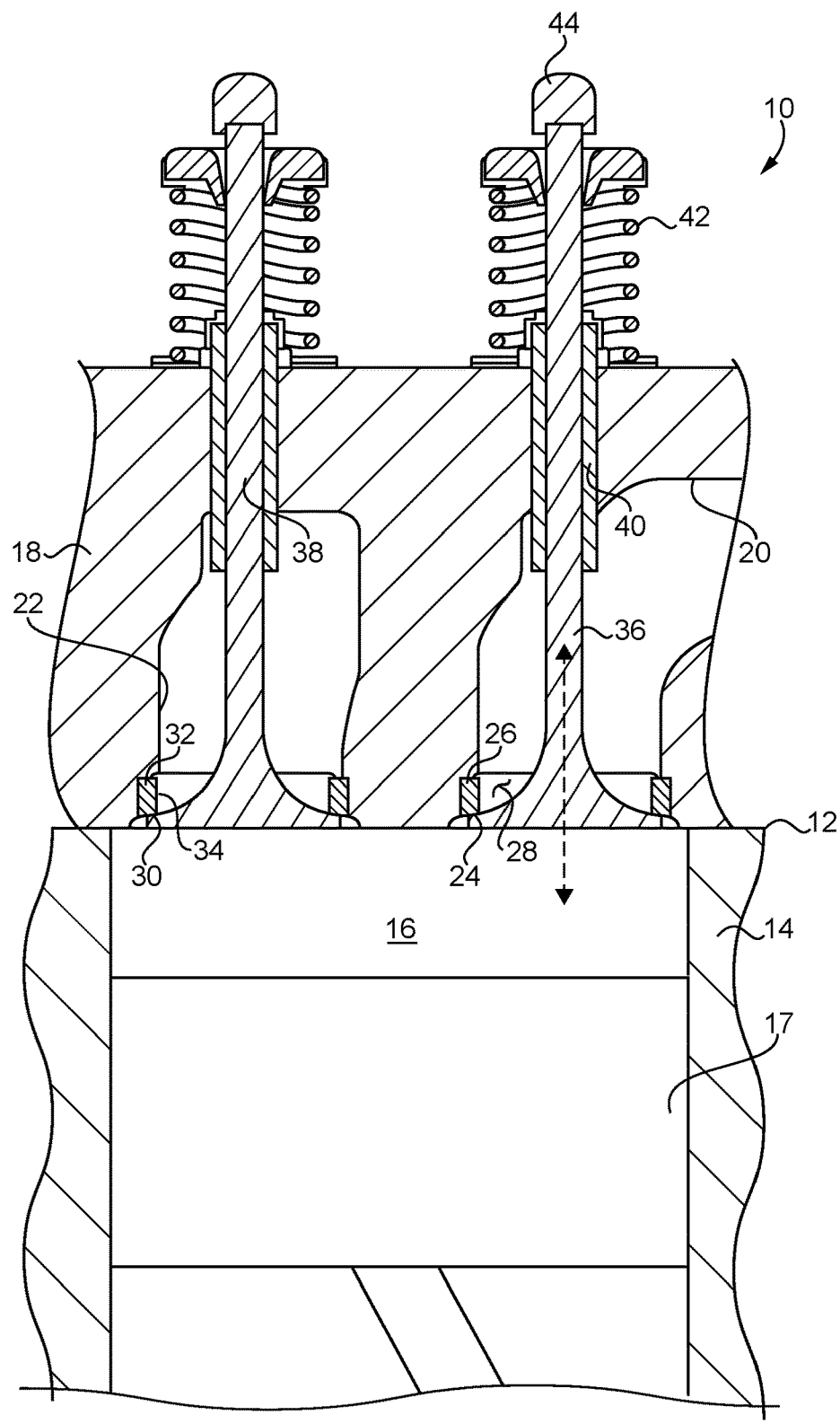
FIG. 1 is a sectioned side diagrammatic view through an internal combustion engine, according to one embodiment.

Referring to FIG. 1, there is shown an internal combustion engine 10, according to one embodiment, and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, a gaseous fuel engine structured to operate on a fuel that is gaseous at standard temperature and pressure, a dual fuel engine, or still another. Although only one cylinder is shown it will be appreciated that cylinder block 14 could have any number of cylinders formed therein, and in any suitable arrangement such as a V-configuration, an in-line configuration, or still another. In a compression ignition diesel engine application, such as a direct-injected diesel engine, suitable fuels could include diesel distillate fuel, biodiesel, blends of these, or still others. A gaseous fuel application might use natural gas, landfill gas, biogas, or various blends of these gases or still others. A dual fuel application might use diesel distillate fuel and natural gas. An engine head 18 is coupled to cylinder block 14 and has a first gas exchange conduit 20 and a second gas exchange conduit 22 formed therein. A valve seat 24 forms an opening 28 to gas exchange conduit 20. In the illustrated embodiment, valve seat 24 is formed by a valve seat insert 26 positioned at least partially within engine head 18. Another valve seat 30 also formed by a valve seat insert 32 forms an opening 34 to gas exchange conduit 22. Gas exchange conduit 20 may be an exhaust conduit structured to convey combustion products from cylinder 16 to an exhaust manifold or the like. Gas exchange conduit 22 may be an intake conduit that conveys fresh intake air or fresh intake air mixed with recirculated exhaust gases, for instance, into cylinder 16 in a generally conventional manner. Engine 10 could be operated as a conventional four-cycle engine, employing generally conventional gas exchange timings, although the present disclosure is not limited in this regard. Engine 10 could include a total of one exhaust valve and a total of one intake valve associated with cylinder 16, although most embodiments employ more than one of each of these.

Engine 10 is further equipped with a gas exchange valve 36 movable between an open position and a closed position to control fluid communications between cylinder 16 and gas exchange conduit 20. Another gas exchange valve 38 is also movable between an open position and a closed position to control fluid communications between cylinder 16 and gas exchange conduit 22. Gas exchange valve 36 may thus include an exhaust valve. It should be appreciated that a gas exchange valve according to the present disclosure could be either of an exhaust valve or an intake valve, and the present description should be understood to refer by way of analogy to either. It should also be appreciated that discussion of a gas exchange valve or associated components in the singular should also be understood to refer by way of analogy to other gas exchange valves contemplated herein except where otherwise indicated. Engine 10 is further equipped with a sleeve 40 that slidably supports and guides gas exchange valve 36, a return spring 42, and a connector structured to couple gas exchange valve 36 to a rocker arm, a valve bridge, directly to a cam, to a valve lifter or to any other suitable actuating device.

As noted above, gas exchange valves can be subjected to harsh operating conditions including in-cylinder temperatures of at least several hundred degrees C., high combustion pressures, and otherwise fatigue-inducing conditions in service. For instance, when gas exchange valve 36 moves from an open position, to a closed position as shown, gas exchange valve 36 contacts valve seat 24 with a force produced by expansion of return spring 42 and also a force produced by relatively highly compressed gases within cylinder 16. Gas exchange valve 36 can experience a full cycle of pressure every two crank turns, which pressure cycling occurs quite rapidly. As will be further apparent from the following description, gas exchange valve 36 is structured to resist fatigue that might otherwise be experienced in response to such conditions.

Figure 2:
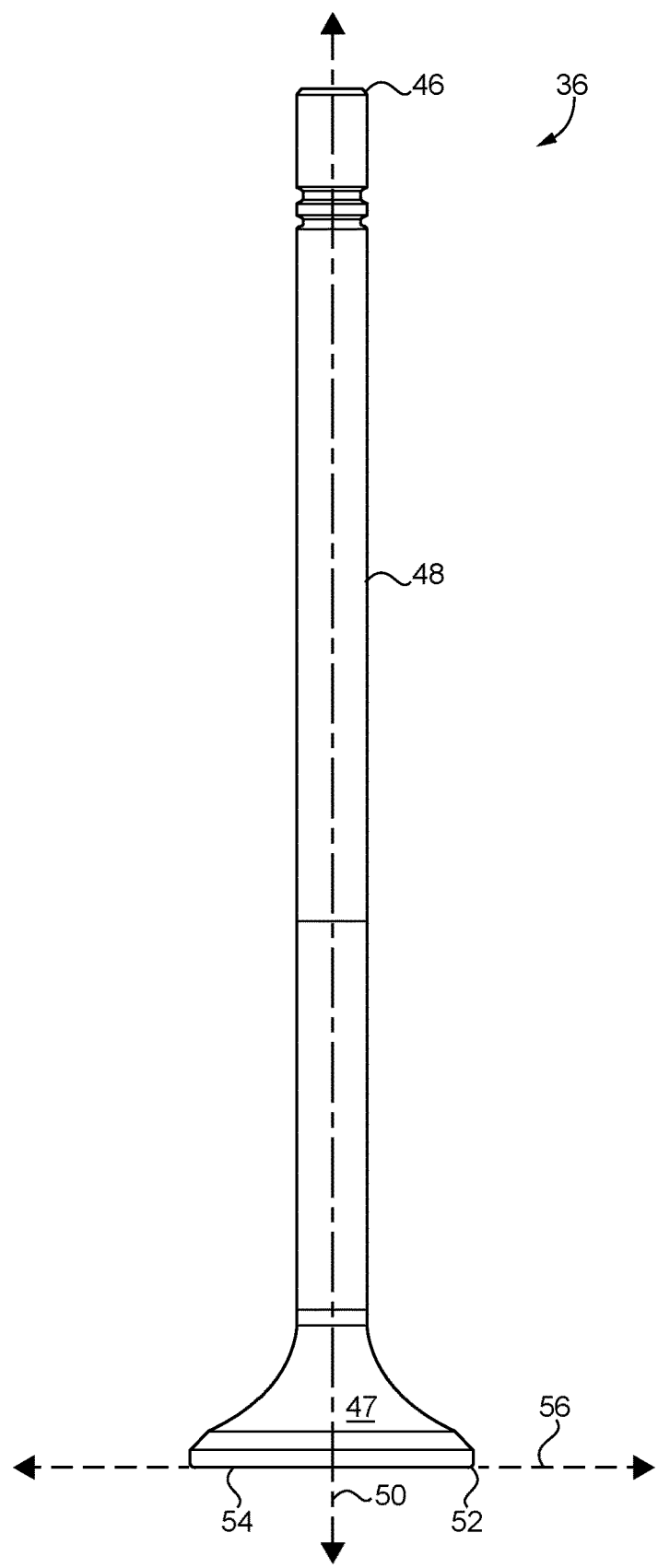
FIG. 2 is a side view of a gas exchange valve, according to one embodiment.

Referring also now to FIG. 2, there is shown gas exchange valve 36 in further detail. Gas exchange valve 36 includes an elongate valve body 46 that may be formed by one or more pieces, and includes a valve stem 48 defining a longitudinal axis 50, and a valve head 52 attached to valve stem 48 and having an outer combustion face 54 defining a plane 56 oriented normal to longitudinal axis 50. Valve body 46 includes an outer surface 47, which within at least part of valve head 52 is exposed to pressures and temperatures of combustion as discussed above. Outer surface 47 could include a native outer surface obtained by forging valve body 46, potentially treated by way of various surface-finishing techniques, or surface 47 could be formed by plating such as electroplating a forging or other part.

Figure 3:
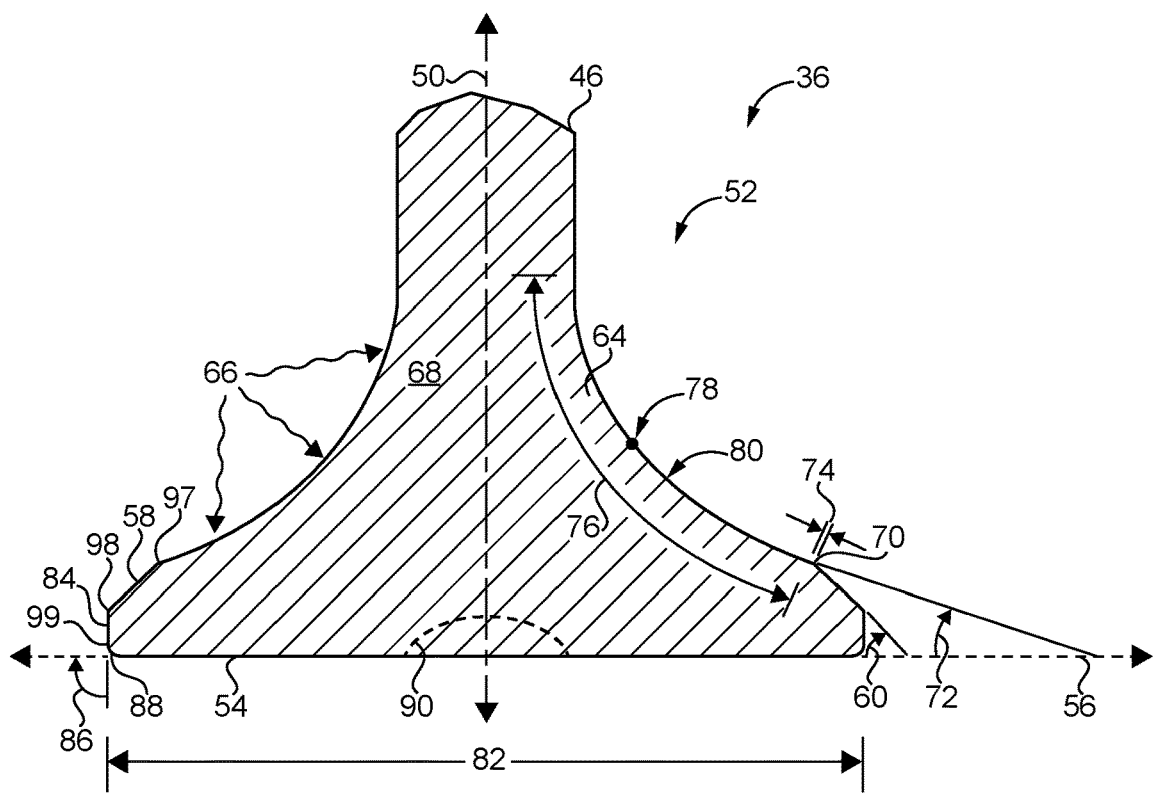
FIG. 3 is a sectioned view through a valve head of a gas exchange valve, according to one embodiment.

Referring also to FIG. 3, there is shown a sectioned view through valve head 52 and illustrating and identifying additional features thereof. Valve head 52 includes an inner sealing face 58 structured to contact valve seat 24 at the closed position of gas exchange valve 36. Inner sealing face 58 may have a conical shape and extends circumferentially and uniformly around longitudinal axis 50. Inner sealing face 58 further defines a face angle 60 relative to plane 56. Valve seat 24 defines a seat angle as further discussed herein relative to plane 56 that is greater than face angle 60. Valve head 52 further includes an under-head fillet 64 transitioning from inner sealing face 58 to valve stem 48. An outer perimetric edge surface 84 extends circumferentially around longitudinal axis 50 and axially between outer combustion face 54 and inner sealing face 58, and is oriented substantially parallel to longitudinal axis 50, such that edge surface 84 is oriented at an angle 86 relative to plane 56 that is about 90°. Edge surface 85 transitions with inner sealing face 58. Valve head 52 also defines a chordal stress zone 66 within under-head fillet 64, further discussed herein. Under-head fillet 64 can also extend circumferentially and uniformly about longitudinal axis 50 and is shaped and proportioned in a manner that provides improved resistance to fatigue over certain other designs.

Under-head fillet 64 is further formed by a material 68, such as forged iron or steel, that is distributed according to a stress-diffusing contour within chordal stress zone 66, and forms a blend 70 between chordal stress zone 66 and inner sealing face 58. Blend 70 defines a blend angle 72 relative to plane 56 that is less than face angle 60 and is in a range of about 18° to about 35°. As used herein, the term "about" should be understood in the context of conventional rounding to a consistent number of significant digits. Accordingly, "about 18" means from 17.5 to 18.4, "about 18.5" means from 18.45 to 18.54, and so on. Quantitative terms disclosed herein not in association with an explicit tolerance or the term "about" should be understood as exact within measurement error. As noted, under-head fillet 64 is blended with inner sealing face 58. "Blended" means that an endpoint of one linear or curvilinear segment is also an endpoint of an adjacent linear or curvilinear segment. Although only a relatively short extent of blend 70 might actually be linear upon outer surface 47, blend 70 may have a small linear running length 74 defining an initial trajectory of outer surface 47 upon under-head fillet 64 advancing away from inner sealing face 58.

Under-head fillet 64 further defines a radius of curvature 80. Radius of curvature 80 may be uniform through at least a majority of a running length 76 of under-head fillet 64. A midpoint 78 of running length 76 is within chordal stress zone 66 in the illustrated embodiment. In one implementation, radius of curvature 80 may be greater than 16 millimeters, and may be less than 17 millimeters. In a refinement, radius of curvature 80 may be greater than 16.2 millimeters, and in still another refinement, radius of curvature 80 is 16.5 millimeters plus or minus a tolerance of 0.5 millimeters. Radius of curvature 80 is the radius of a circle defined by outer surface 47 within under-head fillet 64 and located in a plane shared with longitudinal axis 50. Radius of curvature 80 may be a relatively larger radius than that observed in known gas exchange valves of certain design, and smaller than the size of a radius of curvature in other known designs, reflecting a balance of addition of material to valve head 52 to assist in chordal stress diffusion without negatively impacting gas flow properties, machinability, or causing other problems.

In addition to different structure and/or proportions of radius of curvature 80 in comparison to known designs, blend angle 72 is also different. As noted above, blend angle 72 may be in a range of about 18° to about 35° and is less than face angle 60. Face angle 60 may be less than 45°, and could be significantly less than 45° but still be greater than face angle 60. In a refinement, blend angle 72 is from about 22° to about 30°, and might be from about 21° to about 23° or from about 29° to about 31° in certain embodiments. One practical implementation includes a blend angle of 30° plus or minus a tolerance of 1°. Another implementation includes a blend angle of 22° plus or minus a tolerance of 1°.

Outer combustion face 54 may further define a combustion face diameter dimension 82, and radius of curvature 80 may be greater than 40% of diameter dimension 82. Diameter dimension 82 may be about 40 millimeters. In view of the dimensional and proportional ranges disclosed herein, a variety of different embodiments will be understood to fall within the scope of the present disclosure. The disclosed proportional relationship between radius of curvature 80 and diameter of combustion face 54 will be understood to scale up or scale down with changed overall gas exchange valve size. Blend angles according to the present disclosure can also be understood to scale. Outer combustion face 54 may be uniformly planar. In other instances, a pocket 90 as shown in phantom in FIG. 3 might be formed in outer combustion face 54. A radius 97 is formed between inner sealing face 58 and under-head fillet 64, whereas a radius 98 transitions between inner sealing face 58 and surface 84, yet another radius 98 transitions between inner sealing face 58 and surface 84, and yet another radius 99 transitions between surface 84 and an annular corner face 88 extending circumferentially around longitudinal axis 50 and transitioning from outer combustion face 54 to edge surface 84.

Figure 4:
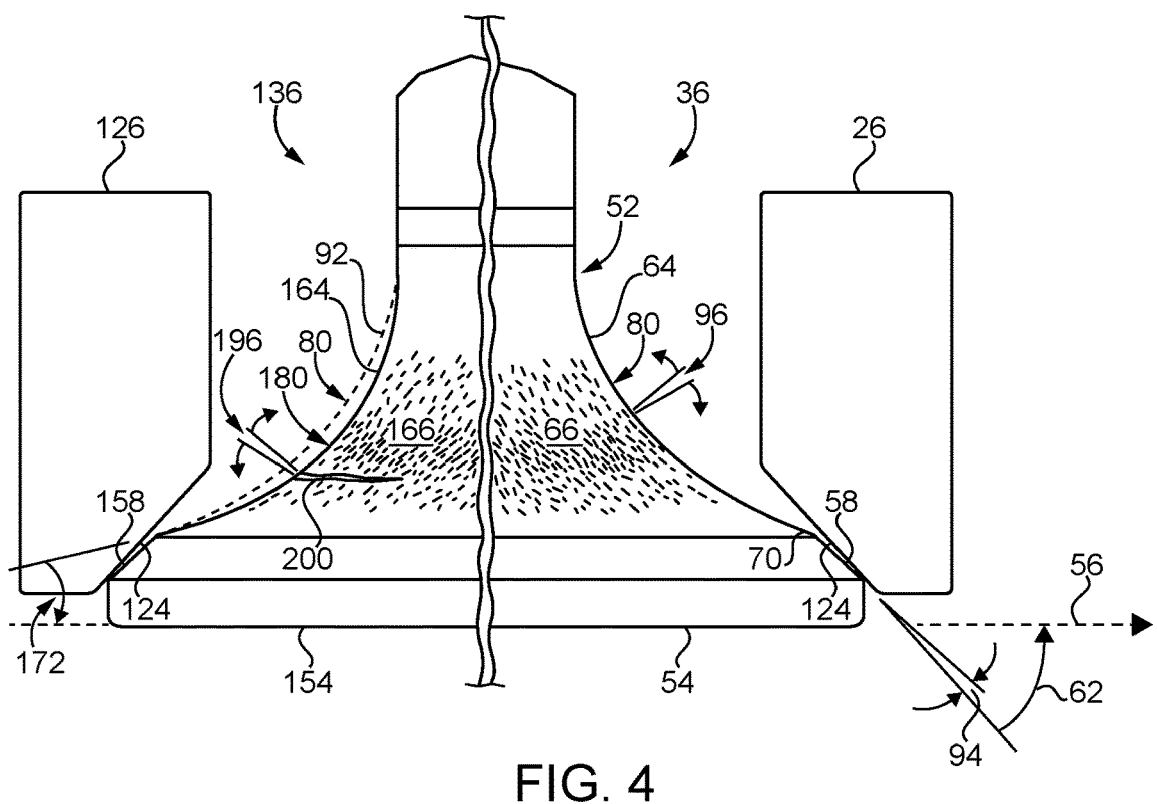
FIG. 4 is a diagrammatic view comparing a gas exchange valve according to the present disclosure with a known design.

Turning now also to FIG. 4, there is shown a comparative representation of a gas exchange valve according to the present disclosure on the right-hand side of the drawing, and according to a known design on the left-hand side of the drawing. Gas exchange valve 36 is shown as it might appear in contact with valve seat 24 in valve seat insert 26. As noted above, face angle 60 may be less than 45°. Seat angle 62 is greater than face angle 60, and in the illustrated embodiment inner sealing face 58 and valve seat 24 define an interference angle 94. Interference angle 94 may be about 1°, or less, and in some instances may be about 0.5°. On the left-hand side of the drawing in FIG. 4 is illustrated a gas exchange valve 136 having an outer combustion face 154, an inner sealing face 158, and an under-head fillet 164. Gas exchange valve 136 is shown as it might appear in contact with a valve seat 124 in a valve seat insert 126. Under-head fillet 164 could be understood to define a radius of curvature 180 analogous to radius of curvature 80, however, in gas exchange valve 136 the analogously defined radius of curvature 180 is smaller than radius of curvature 80, and may be less than 16 millimeters. A dashed line profile 92 is shown in the left-hand side of the drawing in FIG. 4, and presents a comparative view of radius of curvature 80 of gas exchange valve 36 relative to radius of curvature 180 of gas exchange valve 136. It can be seen that additional material is used in gas exchange valve 36 in chordal stress zone 66 compared to a chordal stress zone 166 of gas exchange valve 136.

Blend angle 62 may also be larger than an analogously defined blend angle 172 in gas exchange valve 136. In gas exchange valve 136, blend angle 172 might be less than 18°, such as about 15°. The addition of material in the present disclosure by way of an increased size of the fillet-defined radius of curvature, and optimization of blend angle, can be expected to reduce stress experienced in chordal stress zone 66 as compared to chordal stress zone 166, using a maximum principle stress evaluation, by 20% or more, potentially by 30% or more. In the case of an embodiment of gas exchange valve 36 where blend angle 72 is from about 21° to about 23° and radius of curvature 80 is 16.5 millimeters plus or minus a tolerance of 0.5 millimeters, maximum principle stress may be reduced by about 22% in comparison to gas exchange valve 136. In the case of an embodiment where blend angle 72 is from about 29° to about 31°, and radius of curvature 80 is 16.5 millimeters plus or minus a tolerance of 0.5 millimeters, maximum principle stress in gas exchange valve 36 may be reduced by about 32% from that which might be expected to be observed in gas exchange valve 136. Reduction of maximum principle stress by about 22% may support a fatigue life of gas exchange valve 36 that is improved by a factor of 5 or more over what might be otherwise expected. A reduction in maximum principle stress of about 32% could be expected to provide an improvement in fatigue life by a factor of 10 or potentially even more.

INDUSTRIAL APPLICABILITY

During service, gas exchange valve 36 will be actuated open by way of rotation of a camshaft (not shown) and typically a rocker arm, directly coupled with the camshaft or indirectly coupled to the camshaft by way of valve lifter apparatus. Gas exchange valve 36 will be actuated closed typically by way of return spring 42 and fluid pressure within cylinder 16. As gas exchange valve 36 contacts valve seat 24, material 68 forming valve head 52 and fillet 64 in particular is subjected to stresses, imparting some tendency for microscopic pulling apart of material 68 such as along grain boundaries. Arrows 96 in FIG. 4 show an approximate and illustrative tendency for one material stress phenomenon that might be expected in gas exchange valve 36. Arrows 196 analogously illustrate stresses that might be experienced by gas exchange valve 136. It has been observed that microscopic cracks can begin to form over time in many gas exchange valves, potentially eventually propagating to form a chordal crack 200. Any given axial location along an under-head fillet in gas exchange valves of the type discussed herein can be understood to define a circle extending circumferentially around the longitudinal axis of the valve. Chordal stress and chordal cracks are terms used herein in reference generally to chords of such circles, and it can be noted that crack 200 has propagated generally at a consistent axial location across under-head fillet 164. It is believed that the additional material provided by way of the relatively large radius of curvature 80 in gas exchange valve 64 assists in preventing formation of such microscopic cracks, and inhibits propagation if any such microscopic cracks do occur. Material-forming blend 70 transmits seat impact forces from inner sealing face 58 to material within chordal stress zone 66. Chordal stress zones in a gas exchange valve may have boundaries that are not sharply defined, but become evident only upon operating a plurality of similar gas exchange valves in service a sufficient length of time and for a sufficient number of cycles under actual engine operating conditions to become evident as actual cracks, microcracks or other indicia of fatigue are observed. It can generally be expected that a chordal stress zone as contemplated herein includes at least a middle 50% of running length 76. The dash marks in FIG. 4 upon a surface of the gas exchange valves show an example extent of chordal stress zones 66 and 166, and are relatively denser in distribution where stresses may be more likely to induce fatigue failures, although the present disclosure is not thereby limited. The present disclosure reflects the surprising discovery that blend angle and enlarged radius of curvature can provide an improvement over known designs that is non-linear. In other words, an increase in fatigue life that can be expected by a larger blend angle and increased material of under-head fillet 64 in comparison to known designs may be proportionally larger than the proportional increase in blend angle or radius size.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An internal combustion engine comprising:
    an engine housing including a cylinder block having a cylinder formed therein, an engine head coupled to the cylinder block and having a gas exchange conduit formed therein, and a valve seat forming an opening to the gas exchange conduit;
    a gas exchange valve movable between an open position and a closed position to control fluid communications between the cylinder and the gas exchange conduit;
    the gas exchange valve including a valve stem defining a longitudinal axis, and a valve head attached to the valve stem and having an outer combustion face defining a plane oriented normal to the longitudinal axis;
    the valve head further including an inner sealing face structured to contact the valve seat at the closed position;
    the inner sealing face defining a face angle relative to the plane, and the valve seat defining a seat angle relative to the plane that is greater than the face angle;
    the valve head further including an under-head fillet transitioning from the inner sealing face to the valve stem, and defining a chordal stress zone within the under-head fillet;
    the under-head fillet defines a radius of curvature that is greater than 16 millimeters and less than 17 millimeters; and
    the under-head fillet being formed by a material distributed according to a stress-diffusing contour within the chordal stress zone, and the under-head fillet being blended with the inner sealing face at a blend angle relative to the plane that is less than the face angle and is in a range of about 21° to about 31°.

2. The internal combustion engine of claim 1 further comprising a valve seat insert positioned at least partially within the engine head and including the valve seat, and wherein the face angle is less than 45° and the sealing face and the valve seat define an interference angle of about 1° or less.

3. The internal combustion engine of claim 1 wherein a midpoint of a running length of the under-head fillet is within the chordal stress zone.

4. The internal combustion engine of claim 3 wherein the under-head fillet defines a radius of curvature that is uniform through at least a majority of the running length of the under-head fillet.

5. The internal combustion engine of claim 4 wherein the radius of curvature is greater than 16.5 millimeters.

6. The internal combustion engine of claim 1 wherein the radius of curvature is 16.5 millimeters plus or minus a tolerance of 0.5 millimeters.

7. The internal combustion engine of claim 1 wherein the blend angle is from about 22° to about 30°.

8. The internal combustion engine of claim 1 wherein the gas exchange conduit includes an exhaust conduit and the gas exchange valve includes an exhaust valve.

9. A gas exchange valve for controlling fluid communications between a combustion cylinder and a gas exchange conduit in an internal combustion engine comprising:
    a valve body including a valve stem defining a longitudinal axis, and a valve head attached to the valve stem and having an outer combustion face defining a plane oriented normal to the longitudinal axis;
    the valve head further including an inner sealing face structured to contact the valve seat at the closed position, and an outer perimetric edge surface extending axially between the outer combustion face and the inner sealing face;
    the inner sealing face defining a face angle relative to the plane;
    the valve head further including an under-head fillet transitioning from the inner sealing face to the valve stem, and defining a chordal stress zone within the under-head fillet;
    the under-head fillet defines a radius of curvature that is greater than 16 millimeters and less than 17 millimeters; and
    the under-head fillet being formed by a material distributed according to a stress-diffusing contour within the chordal stress zone, and the under-head fillet being blended with the inner sealing face at a blend angle relative to the plane that is less than the face angle and is in a range of about 21° to about 31°.

10. The gas exchange valve of claim 9 wherein the outer perimetric edge surface is substantially parallel to the longitudinal axis and transitions with the sealing face, and wherein the valve head further includes an annular corner face transitioning from the outer combustion face to the outer perimetric edge surface.

11. The gas exchange valve of claim 9 wherein the outer combustion face defines a combustion face diameter dimension, and the radius of curvature defined by the under-head fillet is greater than 40% of the combustion face diameter dimension.

12. The gas exchange valve of claim 10 wherein the outer combustion face is uniformly planar.

13. The gas exchange valve of claim 11 wherein a midpoint of a running length of the under-head fillet is within the chordal stress zone, and the radius of curvature defined by the under-head fillet is uniform throughout at least a majority of the running length of the under-head fillet.

14. The gas exchange valve of claim 11 wherein the blend angle is from about 22° to about 30°, the face angle is less than 45°, and the radius of curvature is greater than 16 millimeters.

15. The gas exchange valve of claim 14 wherein the radius of curvature is 16.5 millimeters plus or minus a tolerance of 0.5 millimeters.

16. The gas exchange valve of claim 14 wherein the blend angle is from about 21° to about 23°.

17. The gas exchange valve of claim 14 wherein the blend angle is from about 29° to about 31°.

18. A gas exchange valve comprising:
a valve body including a valve stem defining a longitudinal axis, and a valve head attached to the valve stem and having an outer combustion face defining a plane oriented normal to the longitudinal axis;
the valve head further including an inner sealing face extending circumferentially around the longitudinal axis and oriented at a face angle relative to the plane that is less than 45°;
the valve head further including an under-head fillet transitioning from the inner sealing face to the valve stem, and defining a chordal stress zone within the under-head fillet;
the under-head fillet defines a radius of curvature that is greater than 16 millimeters and less than 17 millimeters; and
the valve head is formed throughout by a material, and the under-head fillet being formed by the material distributed according to a stress-diffusing contour within the chordal stress zone, and the material forming a blend between the chordal stress zone and the inner sealing face, and the blend having a blend angle relative to the plane that is in a range of about 18c' to about 35°.

19. The gas exchange valve of claim 18 wherein:
the outer combustion face defines a combustion face diameter dimension;
the under-head fillet defines a radius of curvature that is greater than 40% of the combustion face diameter dimension; and
the blend angle is from about 22° to about 30°.

20. The gas exchange valve of claim 19 wherein the radius of curvature is 16.5 millimeters plus or minus a tolerance of 0.5 millimeters, and the blend angle is 30° plus or minus a tolerance of 1°.

* * * * *